US011871199B2

(12) United States Patent
Usui et al.

(10) Patent No.: US 11,871,199 B2
(45) Date of Patent: Jan. 9, 2024

(54) SOUND SIGNAL PROCESSOR AND CONTROL METHOD THEREFOR

(71) Applicant: Yamaha Corporation, Hamamatsu (JP)

(72) Inventors: Atsushi Usui, Hamamatsu (JP); Takashi Ito, Hamamatsu (JP); Masafumi Kanada, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 32 days.

(21) Appl. No.: 17/673,322

(22) Filed: Feb. 16, 2022

(65) Prior Publication Data

US 2022/0264223 A1 Aug. 18, 2022

(30) Foreign Application Priority Data

Feb. 17, 2021 (JP) ................................ 2021-023330
Feb. 17, 2021 (JP) ................................ 2021-023331

(51) Int. Cl.

| | |
|---|---|
| ***H04R 5/02*** | (2006.01) |
| ***H04R 5/04*** | (2006.01) |
| ***H04S 7/00*** | (2006.01) |
| ***H04S 1/00*** | (2006.01) |
| *H04H 20/47* | (2008.01) |

(52) U.S. Cl.
CPC ............... *H04R 5/04* (2013.01); *H04S 1/002* (2013.01); *H04S 7/30* (2013.01); *H04R 2420/01* (2013.01); *H04S 2400/03* (2013.01)

(58) Field of Classification Search
CPC ....... H04R 5/04; H04R 2420/01; H04S 1/002; H04S 7/30; H04S 2400/03
USPC .......................................................... 381/300
See application file for complete search history.

(56) References Cited

U.S. PATENT DOCUMENTS

| | | | | |
|---|---|---|---|---|
| 10,455,078 | B1 * | 10/2019 | Santhar | H04W 12/02 |
| 2017/0116998 | A1 * | 4/2017 | O'Gwynn | H04W 60/00 |

FOREIGN PATENT DOCUMENTS

| | | | |
|---|---|---|---|
| JP | 2017-220789 | A | 12/2017 |
| JP | 2018-10214 | A | 1/2018 |
| JP | 2018-116153 | A | 7/2018 |
| JP | 6686756 | B2 * | 4/2020 |
| WO | WO-2018135564 | A1 * | 7/2018 |

* cited by examiner

*Primary Examiner* — Ammar T Hamid
(74) *Attorney, Agent, or Firm* — Crowell & Moring LLP

(57) ABSTRACT

A sound signal processor and a control method therefor that enable appropriate processing to be applied to each sound signal and the sound signals to be outputted to an appropriate output destination, while avoiding equipment connection complexity. A first processing unit performs first processing on a first sound signal to generate a second sound signal, and outputs the second sound signal to a mix bus, a second processing unit performs second processing on a third sound signal to generate a fourth sound signal, and outputs the fourth sound signal to the mix bus and a first output destination, and the mix bus mixes the second sound signal with the fourth sound signal to generate a fifth sound signal, and outputs the fifth sound signal to a second output destination.

16 Claims, 7 Drawing Sheets

SOUND SIGNAL PROCESSOR AND CONTROL METHOD THEREFOR

BACKGROUND OF THE INVENTION

Field of the Invention

The present disclosure relates to a sound signal processor and a control method therefor.

Conventionally, sound signal processors that subject sound signals to various kinds of processing to mix the signals, in order to enhance acoustic effects, have been known. For example, in the technology disclosed in Japanese Laid-open Patent Publication (Kokai) No. 2018-116153 and Japanese Laid-open Patent Publication (Kokai) No. 2017-220789, stereo acoustic signals are converted into sum signals and differential signals, and the sum signals and differential signals are each subjected to acoustic effects and other processing before being converted back into stereo acoustic signals. As a result, the acoustic effects of stereo acoustic signals can be adjusted easily and in a variety of ways. Alternatively, sounds with less discomfort can be provided.

Furthermore, conventionally, a technology has been known with which sound signals are subjected to binauralization to reproduce a sense of realism to create a feeling of being present when listening through headphones. However, using loudspeakers to listen to sound that has undergone binauralization causes discomfort. Therefore, technology with which the sounding tone color is switched depending on the equipment connected has also been disclosed (Japanese Laid-open Patent Publication (Kokai) No. 2018-10214). For example, with the technology disclosed in Japanese Laid-open Patent Publication (Kokai) No. 2018-10214, when a specific tone is outputted from headphones, sounds with binaural tones suitable for headphones are outputted.

However, the content of the processing to be applied, such as effects, and the destination to which the sound signal is to be outputted vary depending on the sound signal. Therefore, when a large number of sound signals are acquired from a plurality of channels, the amount of conversion equipment may increase in order to subject each sound signal to the appropriate processing, leading to complex equipment connections.

Furthermore, the user may not always want to apply binauralization. Even listening is performed through headphones, there may be no desire to apply binauralization.

SUMMARY OF THE INVENTION

A first aspect of the present invention provides a sound signal processor and a control method therefor that enable appropriate processing to be applied to each sound signal and the sound signals to be outputted to an appropriate output destination, while avoiding equipment connection complexity.

A second aspect of the present invention provides a sound signal processor and a control method therefor that enable binauralized sound to be outputted only to an appropriate output destination when binauralization is set to be enabled.

Accordingly, the first aspect of the present invention provides a control method for a sound signal processor, comprising the steps of, by a first processing unit, performing first processing on a first sound signal to generate a second sound signal, and outputting the second sound signal to a mix bus, by a second processing unit, performing second processing on a third sound signal to generate a fourth sound signal, and outputting the fourth sound signal to the mix bus and a first output destination, and, by the mix bus, mixing the second sound signal with the fourth sound signal to generate a fifth sound signal, and outputting the fifth sound signal to a second output destination.

Accordingly, the second aspect of the present invention provides a control method for a sound signal processor, comprising the steps of selecting, from among at least a first output destination and a second output destination, an output destination of a sound signal from a mix bus, performing first processing, which includes at least binauralization, on a first sound signal to generate a second sound signal, and outputting the second sound signal to the mix bus, setting the binauralization in the first processing to be enabled/disabled, and when the second output destination is selected, substantially disabling the application to the first sound signal of at least the binauralization in the first processing, even when the binauralization has been set to be enabled.

Further features of the present invention will become apparent from the following description of exemplary embodiments (with reference to the attached drawings).

DESCRIPTION OF THE EMBODIMENTS

The following is a description of the first embodiment of the present invention with reference to the drawings.

Figure 1:
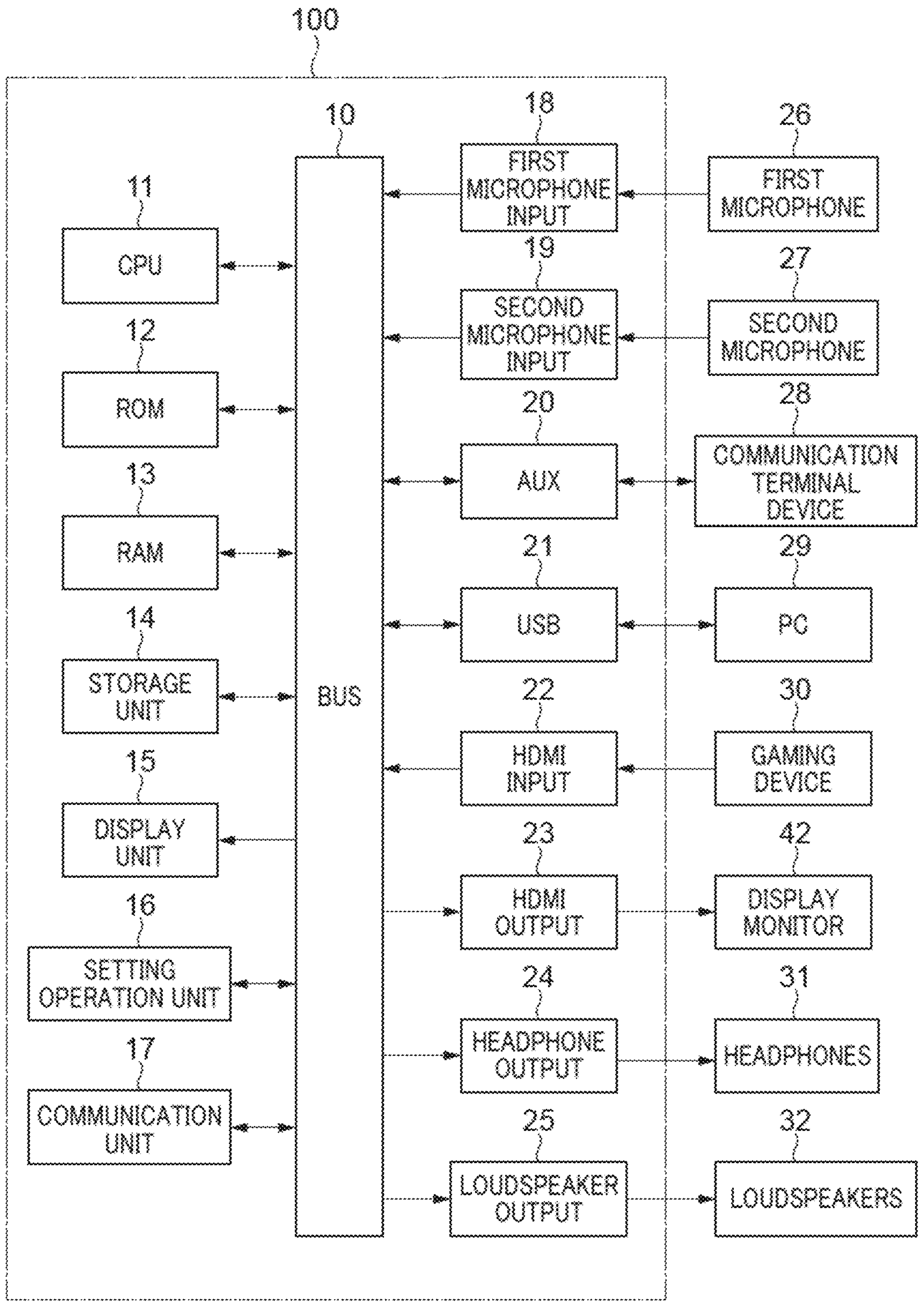
FIG. 1 is a block diagram of a sound signal processor.

FIG. 1 is a block diagram of a sound signal processor according to the first embodiment. This sound signal processor 100 is configured as a mixer device by way of an example. The sound signal processor 100 has a CPU 11, and the CPU 11 exchanges information with a plurality of constituent elements via a bus 10. The sound signal processor 100 has a ROM 12, a RAM 13, a storage unit 14, a display unit 15, and a setting operation unit 16. Furthermore, the sound signal processor 100 has various interfaces for connecting external equipment, and signals are inputted and outputted via the various interfaces between the CPU 11 and the connected external equipment. The various interfaces include a communication unit 17, a first microphone input terminal 18, a second microphone input terminal 19, an AUX terminal 20, a USB terminal 21, an HDMI (registered trademark) input terminal 22, an HDMI output terminal 23, a headphone output terminal 24, and a loudspeaker output terminal 25.

A timer (not shown) is connected to the CPU 11. The CPU 11 controls the entire sound signal processor 100. The ROM 12 stores a control program that is executed by the CPU 11, and various table data, and the like. The RAM 13 stores various data. The storage unit 14 stores various application programs including the aforementioned control program, and various data. The setting operation unit 16 receives inputs of various information from the user. The display unit 15 displays various information. The communication unit 17 may also include a LAN interface and a MIDI (Musical Instrument Digital Interface).

An external microphone can be connected to the first microphone input terminal 18 and the second microphone input terminal 19. For example, a first microphone 26 is connected to the first microphone input terminal 18, and a second microphone 27, which forms a set with headphones 31, is connected to the second microphone input terminal 19. A communication terminal device 28 such as a smartphone is connected to the AUX terminal 20. USB equipment such as a PC 29, for example, which is a personal computer, is connected to the USB terminal 21. HDMI equipment can be connected to the HDMI input terminal 22 and the HDMI output terminal 23. For example, a gaming device 30 is connected to the HDMI input terminal 22, and a display monitor 42 is connected to the HDMI output terminal 23. The headphones 31 are connected to the headphone output terminal 24. Loudspeakers 32 are connected to the loudspeaker output terminal 25. The loudspeakers 32 are not limited to 2-channel loudspeakers, and may also be surround sound loudspeakers, where the number of channels for outputting sound is eight channels (7.1 ch), for example.

Figure 2:
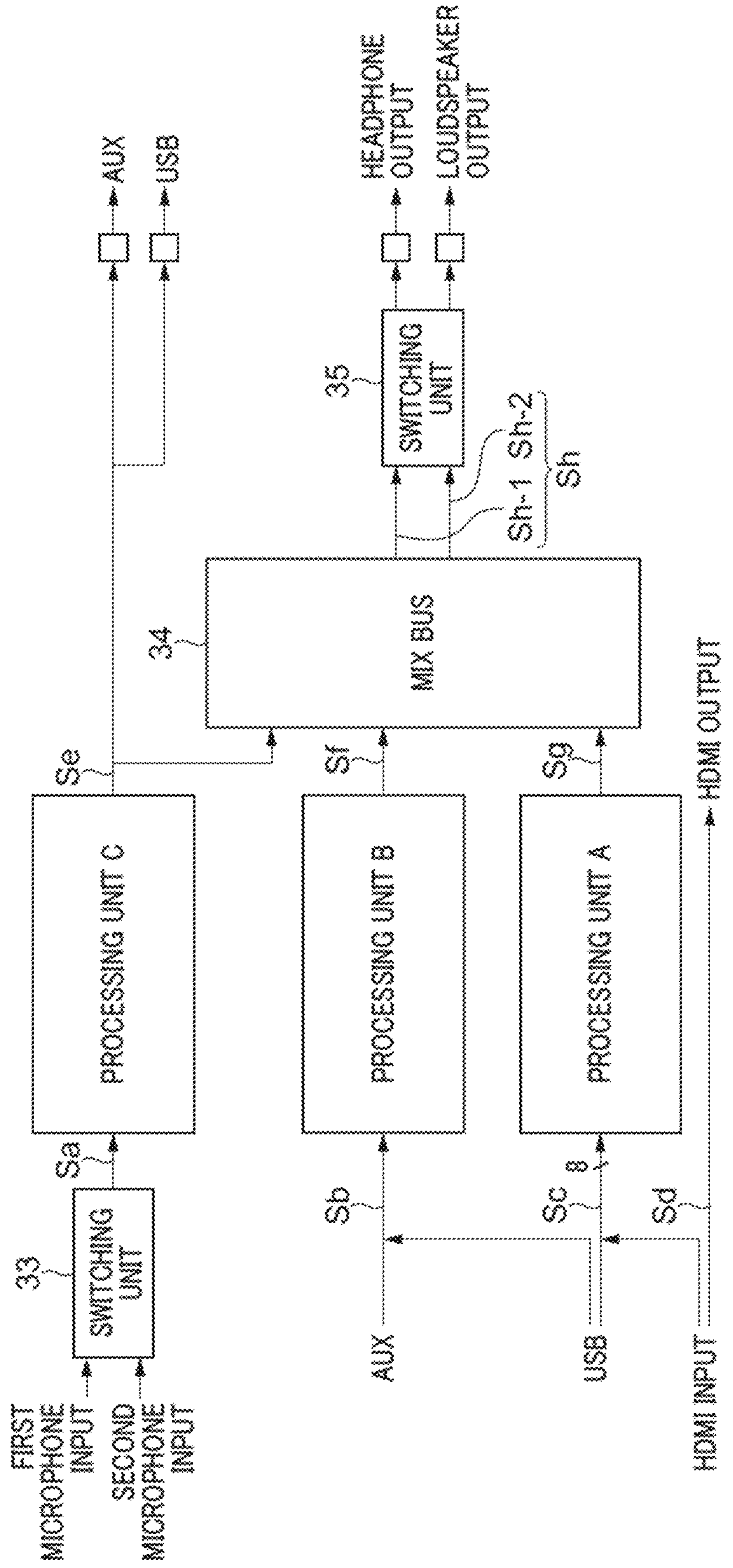
FIG. 2 is a block diagram showing a configuration relating to signal processing.

FIG. 2 is a block diagram showing a configuration relating to signal processing by the sound signal processor 100. The sound signal processor 100 is equipped with processing units A, B, and C, a mix bus 34, and switching units 33, 35, and the like. It should be noted that the functions of the processing units A, B, and C are principally realized through cooperation between the CPU 11, ROM 12, and RAM 13 in addition to the required hardware. The operation of the mix bus 34 and the switching units 33 and 35 is controlled by the CPU 11.

The signal Sd generated by the gaming device 30 and inputted from the HDMI input terminal 22 is outputted to the HDMI output terminal 23 and supplied to the display monitor 42. The signal Sd contains a video signal, and video based on the signal Sd is displayed on the display monitor 42. It should be noted that the signal Sd may contain a sound signal, and that when audio equipment is connected to the HDMI output terminal 23, audio based on the signal Sd is generated by the audio equipment.

The sound signal generated by the gaming device 30 and inputted from the HDMI input terminal 22, or the sound signal generated by the PC 29 and inputted from the USB terminal 21 is inputted to the processing unit A as a sound signal Sc. The sound signal Sc is a sound signal with three or more channels, and is assumed to be an eight-channel signal in the first embodiment. The processing unit A generates a sound signal Sg by subjecting the sound signal Sc to A processing (described subsequently), and outputs the sound signal Sg to the mix bus 34.

The sound signal generated by the communication terminal device 28 and inputted from the AUX terminal 20, or the sound signal generated by the PC 29 and inputted from the USB terminal 21, is inputted to the processing unit B as a sound signal Sb. The sound signal Sb is assumed to be, for example, a voice chat sound signal. The sound signal Sb is generated, for example, by application software which is executed by the communication terminal device 28 or the PC 29. The processing unit B generates a sound signal Sf by subjecting the sound signal Sb to B processing (described subsequently), and outputs the generated sound signal Sf to the mix bus 34.

The switching unit 33 exclusively selects the sound signal collected by the first microphone 26 and inputted from the first microphone input terminal 18, and the sound signal collected by the second microphone 27 and inputted from the second microphone input terminal 19. For example, when the microphone input terminal to which the microphone is connected is selected by the user, and a microphone is connected to both microphone input terminals, the second microphone input terminal 19 is selected preferentially. The switching unit 33 then outputs the sound signal from the selected microphone input terminal to the processing unit C as a sound signal Sa.

The processing unit C generates a sound signal Se by subjecting the sound signal Sa to the C processing, and outputs the sound signal Se to the mix bus 34. The C processing includes, for example, effects and level adjustment. Furthermore, the processing unit C outputs the generated sound signal Se to the AUX terminal 20 and the USB terminal 21. At such time, processing such as D/A conversion or two-channel conversion may be incorporated. Therefore, the sound signal Se is outputted to the communication terminal device 28 and the PC 29, which are connected to the AUX terminal 20 and the USB terminal 21, respectively. Depending on the settings in the communication terminal device 28 and the PC 29, audio is generated according to the sound signal Se.

It should be noted that the A processing, the B processing, and the C processing are mutually different processing. Further, although it is assumed that the sound signal Sa is inputted from a microphone, it may also be a signal that is inputted from a different channel than the input channel of the sound signal Sc. Furthermore, the output destination of the sound signal Se (connected to the AUX terminal 20 or USB terminal 21), which is outputted without requiring the mix bus 34, should be different from the output destination (connected to the headphone output terminal 24 or loudspeaker output terminal 25) for a sound signal Sh.

The mix bus 34 mixes at least the sound signal Sg and the sound signal Se to generate the sound signal Sh. In the first embodiment, the sound signal Sf is mixed with the sound signals Sg and Se to generate the sound signal Sh. The mix bus 34 outputs the sound signal Sh to the headphone output terminal 24 or the loudspeaker output terminal 25 via the switching unit 35. Here, the sound signal Sh contains a headphone signal Sh−1 and a loudspeaker signal Sh−2. The switching unit 35 exclusively selects the output destination of the sound signal Sh. For example, when the headphones 31 are connected to the headphone output terminal 24, the headphone output terminal 24 is selected as the output destination, and when the headphones 31 are not connected to the headphone output terminal 24, the loudspeaker output terminal 25 is selected as the output destination. When the headphone output terminal 24 is selected, the headphone signal Sh−1 is outputted to the headphones 31. When the loudspeaker output terminal 25 is selected, the loudspeaker signal Sh−2 is outputted to the loudspeakers 32. It should be noted that, when the switching unit 35 outputs the sound signal Sh, level adjustment and D/A conversion may be performed. In particular, when the headphone signal Sh−1 is outputted, the output characteristic may also be adjusted to match the headphones.

Figure 3:
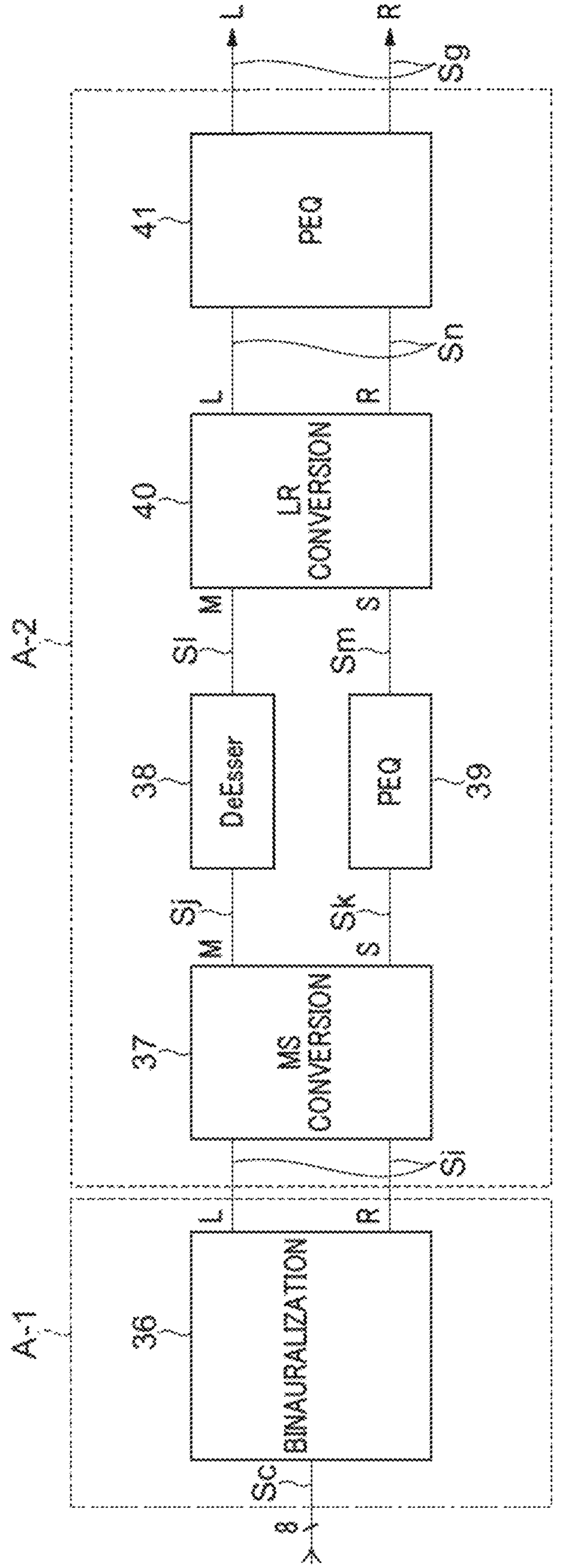
FIG. 3 is a detailed block diagram of a processing unit according to the first embodiment of the present invention.

FIG. 3 is a detailed block diagram of the processing unit A according to the first embodiment. The processing unit A is configured from a front-end processing unit A-1 and a back-end processing unit A-2. The A processing consists of binauralization by the front-end processing unit A-1 and ambient sound enhancement processing by the back-end processing unit A-2. The front-end processing unit A-1 includes a binauralization unit 36. The back-end processing unit A-2 includes an MS conversion unit 37, a DeEsser 38, a PEQ 39, an LR conversion unit 40, and a PEQ 41. Both the PEQs 39 and 41 are 4-band parametric equalizers, for example. However, the PEQs 39 and 41 do not have to be 4-band equalizers, nor do they have to be PEQs, and may be graphic equalizers (GEQs), for example.

Figure 4:
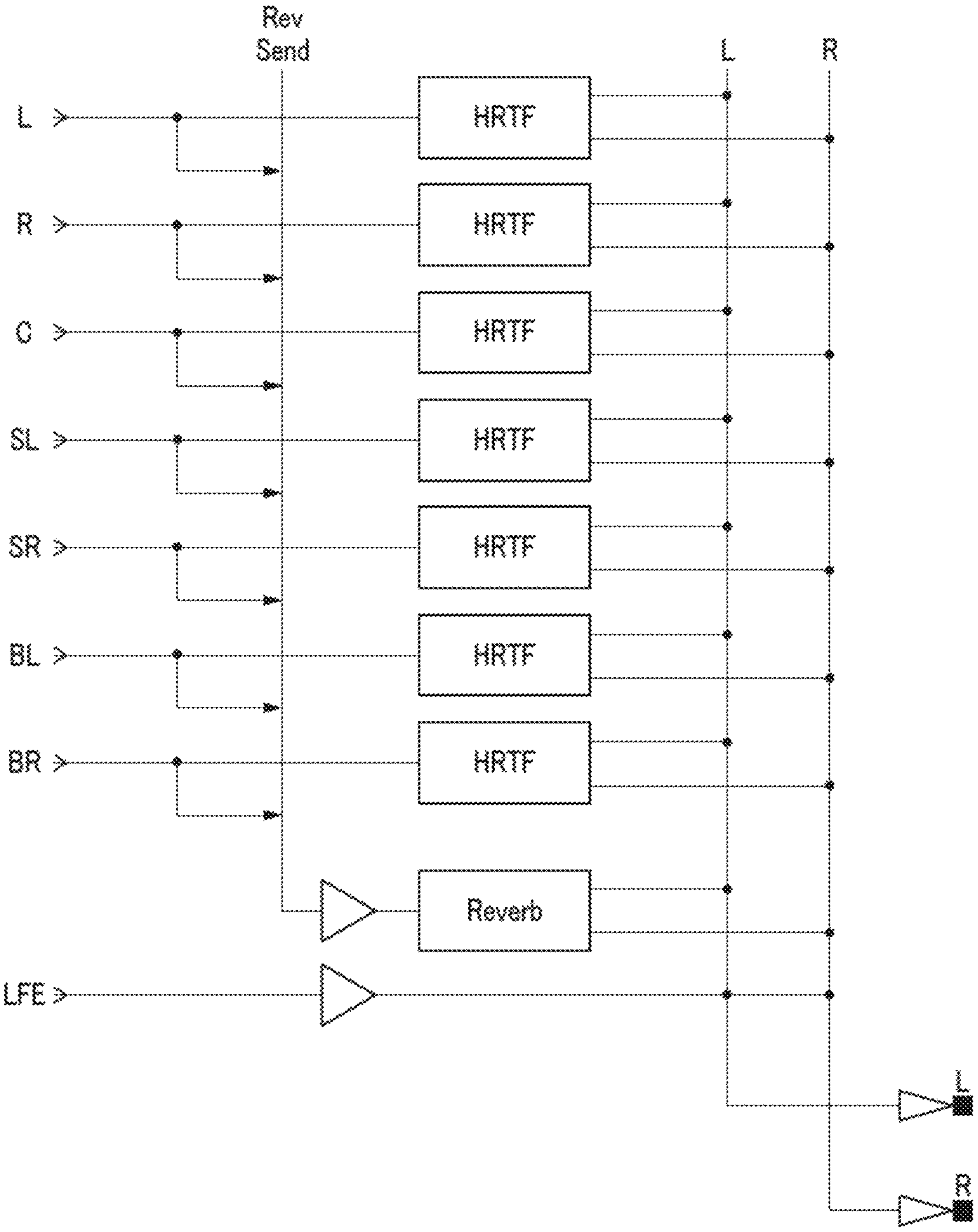
FIG. 4 is a diagram showing the flow of signals in a binauralization unit.

FIG. 4 is a diagram showing the flow of signals in the binauralization unit 36. The sound signal Sc is, as an example, an audio signal constituted by 7.1 channels (C: center, L: front L, R: front R, SL: surround L, SR: surround R, BL: surround back L, BR: surround back R, LFE: subwoofer).

A head-related transfer function (HRTF) is an impulse response that expresses the difference in loudness, arrival time, and frequency response of sound arriving at the left and right ears, respectively, from a virtual loudspeaker placed in a certain position. For signals other than LFE, HRTF and reverb are applied according to the respective signals. The purpose for applying reverb is to reproduce a sense of distance from the sound source. However, HRTF and reverb are not applied to LFE because it is difficult to sense localization. An 8-channel sound signal Sc is converted into a stereo signal through binauralization by the binauralization unit 36, that is, is converted into a stereo signal having two channels, namely L channel and R channel. This stereo signal is inputted to the MS conversion unit 37 in the back-end processing unit A-2 as a sound signal Si.

In the back-end processing unit A-2 (FIG. 3), the MS conversion unit 37 generates a sum signal Sj and a differential signal Sk from the sound signal Si. If the left signal of the sound signal Si is represented by L and the right signal thereof by R, the sum signal Sj is calculated by Sj=(L of Si)/2+(R of Si)/2. The differential signal Sk is also calculated by Sk=(L of Si)/2−(R of Si)/2.

Figure 5:
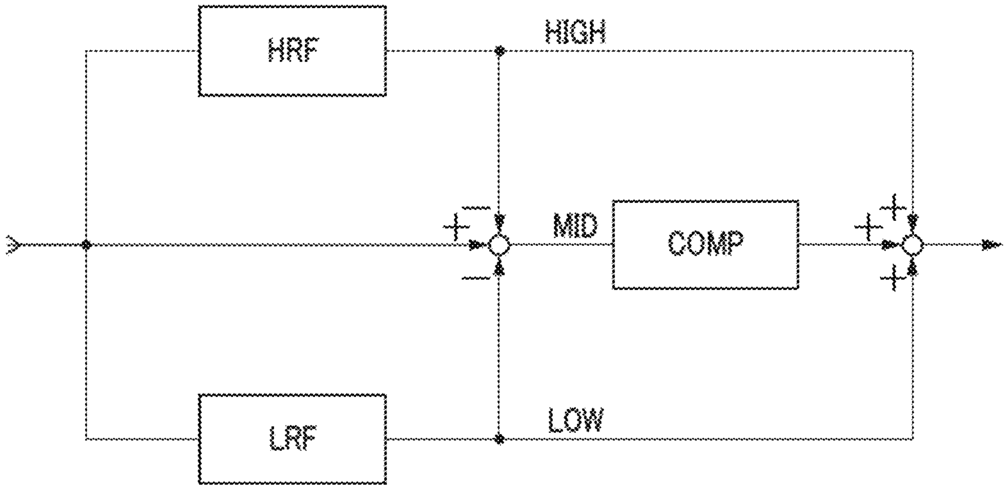
FIG. 5 is a diagram showing a detailed DeEsser configuration.

FIG. 5 is a diagram showing a detailed configuration of the DeEsser 38. The DeEsser 38 is equipped with an HPF (high-pass filter), a LPF (low-pass filter), a COMP (compressor), and the like, and generates a post-processing sum signal S1, which is obtained by performing processing to reduce the sound pressure in the middle sound range, on the sum signal Sj. The PEQ 39 generates a post-processing differential signal Sm, which is obtained by performing processing to increase the sound pressure in a predetermined band for the differential signal Sk.

For example, when a shooting game is being played, the DeEsser 38 reduces the sound of gunfire due to game user operation, thereby alleviating noise. In addition, the PEQ 39 emphasizes side sounds, making it easier to hear the footsteps of enemies who are firing shots. Therefore, although the predetermined band is not limited, this band is desirably a band of frequencies that facilitate sensing of the directionality of sound, which mainly includes ambient sounds, in order to make the ambient sounds easier to hear.

The LR conversion unit 40 generates a sound signal Sn by converting the post-processing sum signal S1 and the post-processing differential signal Sm into a stereo signal. If the left signal of sound signal Sn is represented by L and the right signal thereof is represented by R, the L signal of sound signal Sn is calculated by S1+Sm. The R signal of the sound signal Sn is calculated by S1−Sm. The PEQ 41 increases or decreases the sound pressure in each band for the sound signal Sn according to the settings. As a result, a sound signal Sg, which has undergone an overall audio quality adjustment, is outputted from the processing unit A. It should be noted that it is not necessary to install the PEQ 41.

The B processing applied by the processing unit B (FIG. 2) to the sound signal Sb includes, as an example, binauralization for voice chat. For example, HRTF and/or reverb is applied to the sound signal Sb to generate a sound signal Sf, which is a stereo signal. It should be noted that the CPU 11 may switch between applying or not applying HRTF or reverb according to a switching instruction from the user. There may also be cases where neither HRTF nor reverb is applied, depending on the switching instruction from the user.

According to the first embodiment, the processing unit A (the first processing unit) performs the ambient sound enhancement processing (the first processing) using the back-end processing unit A-2 on the sound signal Si (the first sound signal) to generate the sound signal Sg (the second sound signal), and outputs the sound signal Sg to the mix bus 34. Furthermore, the processing unit C (the second processing unit) performs the C processing (the second processing) on the sound signal Sa (the third sound signal) to generate the sound signal Se (the fourth sound signal), and also outputs the sound signal Se to the mix bus 34 and the first output destination (the communication terminal device 28 or the PC 29). The mix bus 34 mixes at least the sound signal Sg (the second sound signal) and the sound signal Se (the fourth sound signal) to generate the sound signal Sh (the fifth sound signal), and outputs the sound signal Sh to the second output destination (the headphones 31 or the loudspeakers 32). Therefore, it is possible to apply appropriate processing to each sound signal and output the sound signals to an appropriate output destination while avoiding equipment connection complexity. For example, even when a large number of sound signals are acquired from a plurality of systems, it is not necessary to connect a lot of pieces of conversion equipment in order to apply appropriate processing to each sound signal, thus avoiding complex connections.

In addition, the sound signal Si is converted into a stereo sound signal Sg by the ambient sound enhancement processing (the first processing) through the generation of the sum signal Sj and the differential signal Sk, as well as the generation of the post-processing sum signal S1 and the post-processing differential signal Sm, and hence ambient sound can easily be heard.

The sound signal Si is also generated as a stereo signal by subjecting the 8-channel sound signal Sc (the sixth sound signal) to binauralization (the third processing) in the front-end processing unit A-1. It is therefore possible to reproduce a sense of realism. It should be noted that, from this perspective, the sound signal Sc should be a sound signal with three or more channels. It should be noted that the front-end processing unit A-1 is not essential to achieve the advantageous effect of subjecting each sound signal to the appropriate processing and outputting the sound signals to an appropriate output destination while avoiding equipment connection complexity. Therefore, the sound signal Si (the first sound signal) may be a sound signal that is inputted to the sound signal processor 100 as a stereo signal.

Furthermore, the processing unit B (the fourth processing unit) performs the B processing (the fourth processing) on the sound signal Sb (the seventh sound signal) to generate the sound signal Sf (the eighth sound signal), and outputs the sound signal Sf to the mix bus 34. The mix bus 34 generates the sound signal Sh (the fifth sound signal) by further mixing the sound signal Sf (the eighth sound signal) with the sound signal Sg (the second sound signal) and the sound signal Se (the fourth sound signal). It is thus possible to output sounds such as voice chat audio together. It should be noted that it is not essential to provide the processing unit B. Therefore, the sound signal Sh (the fifth sound signal) may be a signal that is obtained by mixing the sound signal Sg (the second sound signal) and the sound signal Se (the fourth sound signal) without including the sound signal Sf.

In addition, due to being a sound signal that is outputted from the microphones (26, 27), the sound signal Sa (the third sound signal) can be processed together with the voice of the user playing the game. It should be noted that the source from which the sound signal Sa is acquired is not limited to a microphone.

Furthermore, if the sound signal Sc (the sixth sound signal) is a sound signal which is outputted from the gaming device 30, the sound signal can be processed together with gaming sounds and the like. If the sound signal Sb (the seventh sound signal) is a sound signal which is outputted via an application, for example, this signal can be processed together with voice chat audio and the like.

Furthermore, if the output destination of the sound signal Se, which is outputted without the need for the mix bus 34, is a computer such as the communication terminal device 28 or the PC 29, sound which has been subjected to the C processing can be outputted to the computer. Further, if the output destination of the sound signal Sh is audio output equipment such as the headphones 31 or the loudspeakers 32, sound which has been subjected to the A, B, and C processing can be mixed and outputted to the audio output equipment. It should be noted that the headphones 31 are an example of on-ear sound output equipment, and may also be earphones.

The second embodiment of the present invention will be described hereinbelow with reference to the drawings. The same reference signs have been assigned in the second embodiment to a configuration which is the same as that of the first embodiment, and a repetitive description thereof is omitted.

Figure 6:
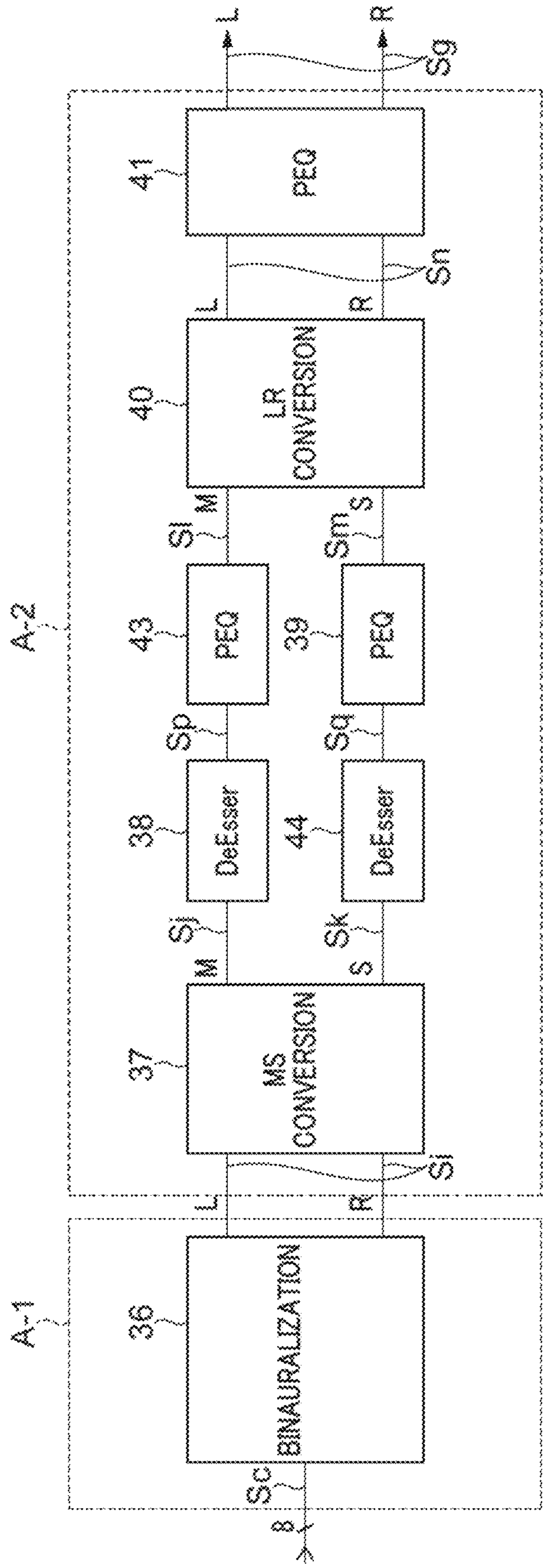
FIG. 6 is a detailed block diagram of the processing unit according to the second embodiment of the present invention.

FIG. 6 is a detailed block diagram of a processing unit A according to the second embodiment. The processing unit A is configured from a front-end processing unit A-1 and a back-end processing unit A-2. The processing unit A according to the second embodiment differs from the processing unit A according to the first embodiment in having a PEQ 43 between the DeEsser 38 and the LR conversion unit 40, and in having a DeEsser 44 between the MS conversion unit 37 and the PEQ 39. The PEQ 43 is, as an example, a 4-band parametric equalizer, similarly to the PEQs 39 and 41. However, the PEQs 43, 39, and 41 do not have to be 4-band, nor do they have to be PEQs, and may also be graphic equalizers (GEQs), for example.

The configuration and operation of the DeEsser 44 are similar to the configuration and operation of the DeEsser 38 shown in FIG. 5, so a detailed explanation thereof is omitted. As shown in FIG. 6, the DeEsser 38 performs processing to reduce mid-range sound pressure, on the sum signal Sj, thereby generating the sum signal Sp. The DeEsser 44 performs processing to reduce the mid-range sound pressure, on the differential signal Sk, and generates a differential signal Sq.

The PEQ 43 generates the post-processing sum signal S1, which is processed to increase the sound pressure in a predetermined band for the sum signal Sp. The PEQ 39 generates the post-processing differential signal Sm, which is obtained by performing processing to increase the sound pressure in a predetermined band for the differential signal Sq.

It should be noted that, by providing a DeEsser and a PEQ on both the channel of the sum signal Sj and the channel of the differential signal Sk, it is easy to match the phases of the post-processing sum signal S1 and the post-processing differential signal Sm. However, when the advantageous effect of phase alignment is not required, the DeEsser 44 and the PEQ 43 may be eliminated.

The detailed operation of the switching unit 35 (FIG. 2) according to the second embodiment will now be described. The headphone output terminal 24 is a terminal (a stereo pin jack or a USB terminal, or the like) into which a plug (not shown) extending from stereo headphones 31 is inserted. When the above plug is inserted into the headphone output terminal 24, the corresponding detection signal is sent to the CPU 11. Upon receiving the detection signal, the CPU 11 discriminates whether or not the headphones 31 are connected to the headphone output terminal 24. It should be noted that the output destination may be designated through user operation of the setting operation unit 16. In such a case, it is not necessary to configure the system to transmit a detection signal due to the plug insertion, and the CPU 11 selects the output destination on the basis of designation by the user.

The user also inputs a setting instruction to set the binauralization to be enabled or disabled by using the setting operation unit 16, which serves as a setting unit. The CPU 11 sets the binauralization by the binauralization unit 36 (FIG. 3) to be enabled or disabled according to the instruction from the user via the setting operation unit 16. The enabled/disabled setting status of the binauralization is stored in the RAM 13. The actual application of the binauralization by the binauralization unit 36 is conditional upon the binauralization being set to be “enabled”. When the binauralization is set to be “disabled”, the binauralization is not applied.

The CPU 11 controls whether the application of the binauralization by the binauralization unit 36 is enabled or substantially disabled. The CPU 11 enables or substantially disables the application of binauralization on the basis of the setting status of the binauralization and the determination status of whether or not the headphones 31 are connected to the headphone output terminal 24. For example, when disabling the application of the binauralization, the CPU 11 causes the sound signal Si to be inputted to the MS conversion unit 37 through a downmix unit (not shown) instead of the binauralization unit 36. In the downmix unit (not shown), the 8-channel sound signal Si is simply downmixed into an L/R 2-channel signal.

Alternatively, when the application of the binauralization is disabled or substantially disabled (substantially not applied), the following techniques may be adopted. First, in the normal binauralization by the binauralization unit 36, the filter coefficients of a plurality of taps in the equation are each set in the implementation of the HRTF. Therefore, the degree of application of the binauralization may also be weakened by adjusting the filter coefficients of the plurality of taps. In other words, the CPU 11 uses different parameters for the binauralization when the application of the binauralization is substantially disabled compared to when the application of the binauralization is enabled. It should be noted that setting the filter coefficients of all other taps except one of the plurality of taps to 0 is equivalent to disabling (stopping) the application of the binauralization. From this perspective, the concept of “substantially disabling” may include not only stopping the application of the binauralization, but also weakening the degree of application of the binauralization.

Figure 7:
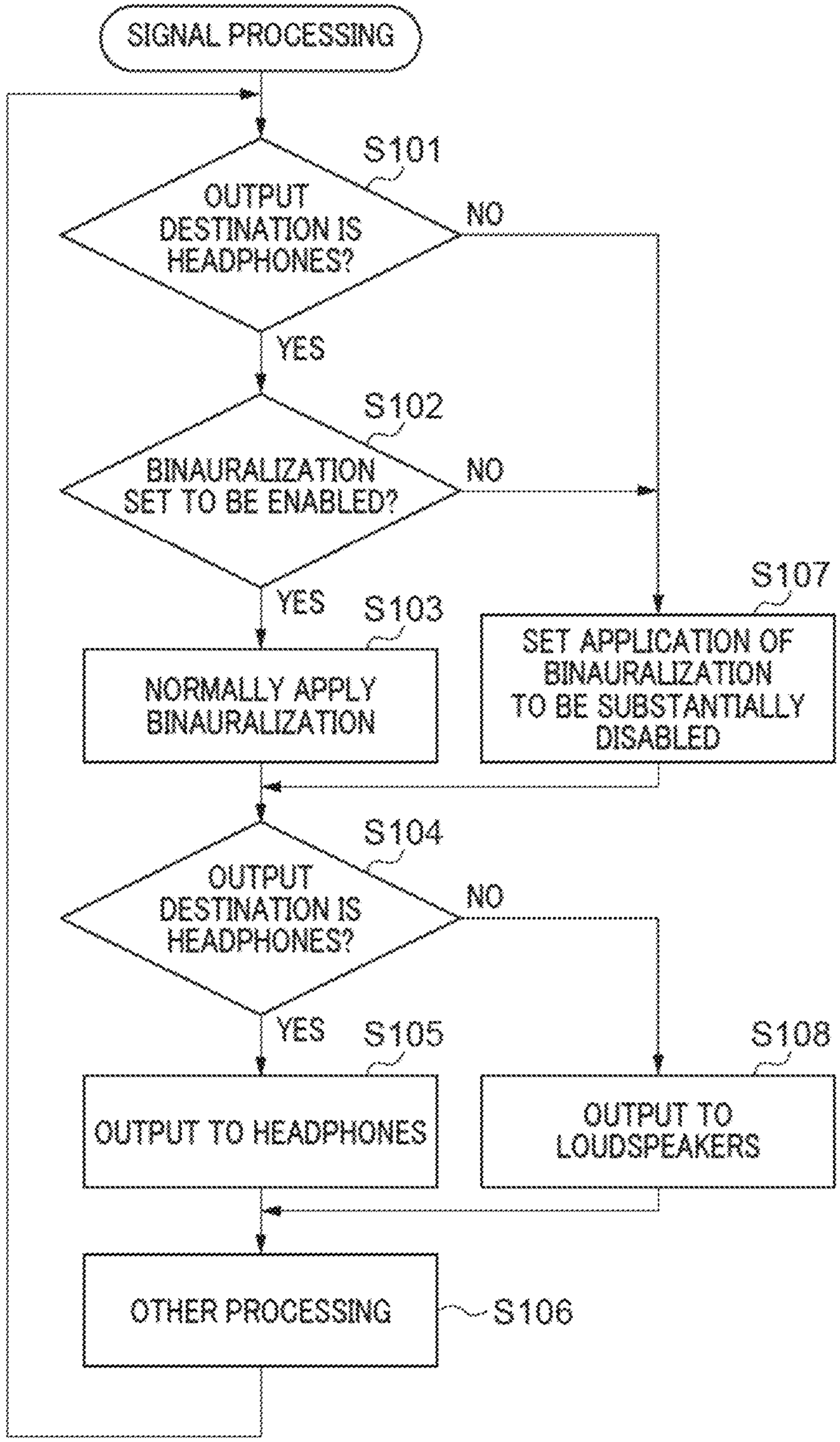
FIG. 7 is a flowchart showing signal processing according to the second embodiment of the present invention.

FIG. 7 is a flowchart showing the signal processing according to the second embodiment. This processing is implemented by the CPU 11 expanding a program stored in the ROM 12 in the RAM 13 and executing the program. This processing is started when the power of the sound signal processor 100 is turned on or when the sound signal processor 100 shifts to the signal output mode.

First, in step S101, the CPU 11 discriminates whether or not the output destination of the sound signal Sh is the headphone output terminal 24 (headphones 31). For example, when headphones 31 are connected to the headphone output terminal 24, as described above, the headphone output terminal 24 is discriminated as the output destination. It should be noted that, as described above, when the output destination is designated through user operation, the output destination is discriminated on the basis of that designation. When the output destination of the sound signal Sh is the headphone output terminal 24, the CPU 11 advances the processing to step S102. When, on the other hand, the output destination of the sound signal Sh is not the headphone output terminal 24, the output destination is the loudspeaker output terminal 25 (the loudspeakers 32), and hence the CPU 11 advances the processing to step S107.

In step S102, the CPU 11 refers to the setting status of enabling/disabling the binauralization stored in the RAM 13, and discriminates whether or not the binauralization setting is "enabled". When the binauralization setting is not "enabled," the CPU 11 advances the processing to step S107. When the binauralization setting is "enabled," the CPU 11 advances the processing to step S103.

In step S103, the binauralization by the binauralization unit 36 (FIG. 3) is applied as usual in the A processing, as described above. On the other hand, in step S107, the CPU 11 substantially disables (including stops applying) the application of the binauralization by the binauralization unit 36 in the A processing. After steps S103 and S107, the CPU 11 advances the processing to step S104.

In step S104, the CPU 11 discriminates whether or not the output destination of the sound signal Sh is the headphone output terminal 24 (the headphones 31). When the output destination of the sound signal Sh is the headphone output terminal 24, in step S105, the CPU 11 switches the signal output destination in the switching unit 35 to the headphone output terminal 24, and outputs the headphone signal Sh−1 from the headphone output terminal 24 to the headphones 31. The headphone signal Sh−1 is a sound signal that is obtained by mixing the sound signal Sg and the sound signal Sf that have undergone binauralization. The user can thus listen to realistic sound using the headphones 31. After step S105, the CPU 11 advances the processing to step S106.

As a result of the discrimination in step S104, when the output destination of the sound signal Sh is not the headphone output terminal 24, the output destination is the loudspeaker output terminal 25 (the loudspeaker 32), and hence the CPU 11 advances the processing to step S108. In step S108, the CPU 11 switches the output destination of the signal in the switching unit 35 to the loudspeaker output terminal 25, and outputs the loudspeaker signal Sh−2 from the loudspeaker output terminal 25 to the loudspeakers 32. The loudspeaker signal Sh−2 is a sound signal that is obtained by mixing the sound signal Sg and the sound signal Sf, to which binauralization has not been substantially applied. Therefore, the user can hear the sound with no sense of discomfort through the loudspeakers 32. After step S108, the CPU 11 advances the processing to step S106.

In step S106, the CPU 11 executes other processing and returns the processing to step S101. In other processing, for example, in addition to accepting various instructions from the user, such as the instruction to set the binauralization to be enabled/disabled, the processing corresponding to the various instructions is executed. The CPU 11 also ends the processing shown in FIG. 7 if the device power is turned off or if there is an instruction to end the signal output mode.

According to the second embodiment, the switching unit 35 serving as the selection unit selects the output destination of the sound signal from the mix bus 34 from among at least the headphones 31 (the first output destination) and the loudspeakers 32 (the second output destination). The processing unit A (the first processing unit) performs the A processing (the first processing), including at least binauralization, on the sound signal Sc (the first sound signal) to generate the sound signal Sg (the second sound signal), and outputs the sound signal Sg to the mix bus 34. Enabling/disabling the binauralization in the A processing is set according to a user operation. When binauralization is set to be enabled and the headphones 31 are selected as the output destination, the CPU 11, serving as a controller, normally applies binauralization to the sound signal Sc in the A processing. When the loudspeakers 32 are selected as the output destination, the CPU 11 substantially disables the application of at least the binauralization of the A processing to the sound signal Sc, even if the binauralization is set to be enabled. Therefore, when the binauralization has been set to be enabled, sound which has been subjected to binauralization can be outputted only to the headphones 31, which are the appropriate output destination.

For example, the CPU 11 stops applying the binauralization to the sound signal Sc. Alternatively, the CPU 11 weakens the degree of application of the binauralization by using different parameters for the binauralization when the application of the binauralization is substantially disabled compared to when the application of the binauralization is enabled. Such processing enables sound signals that have not been binauralized substantially to be outputted to the loudspeakers 32, thus enabling sound to be outputted without discomfort.

Furthermore, the processing unit B (the second processing unit) performs the B processing (the second processing) on the sound signal Sb (the third sound signal), which has a different number of channels from the sound signal Sc (the first sound signal), to generate the sound signal Sf (the fourth sound signal), and outputs the sound signal Sf to the mix bus 34. Because the sound signal Sf is mixed with the sound signal Sg and is outputted to the selected output destination, it is also possible to output another sound signal with a different number of channels, such as voice chat audio. It should be noted that the B processing is not required to include binauralization.

In addition, because the first output destination and the second output destination are selected exclusively, it is possible to clearly distinguish whether or not the binauralization is actually applied according to the output destination.

It should be noted that the first output destination is the headphones 31, but because the headphones 31 are an example of on-ear sound output equipment, the first output destination may be earphones. Therefore, the headphone signal Sh−1, binauralized as usual, can be outputted only to the on-ear sound output equipment.

It should be noted that it is not essential to provide the processing unit C. Therefore, sound signal Sh may be a signal that is obtained by mixing the sound signal Sg and the sound signal Sf without including the sound signal Se. It should be noted that when binauralization is set to be enabled, it is not essential to provide the back-end processing unit A-2 in the processing unit A, as far as obtaining the advantageous effect of outputting binauralized sound only to the appropriate output destination. It should be noted that the source from which the sound signal Sa is acquired is not limited to a microphone.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-023330 and No. 2021-023331 both filed on Feb. 17, 2021 which are hereby incorporated by reference herein in their entireties.

What is claimed is:

1. A control method for a sound signal processor, comprising the steps of:

selecting, from among at least a first output destination and a second output destination, an output destination of a sound signal from a mix bus;

performing first processing, which includes at least binauralization, on a first sound signal to generate a second sound signal, and outputting the second sound signal to the mix bus;

setting the binauralization in the first processing to be enabled/disabled; and when the second output destination is selected, substantially disabling the application to the first sound signal of at least the binauralization in the first processing, even when the binauralization has been set to be enabled.

2. The control method according to claim 1, wherein, when the second output destination is selected and the binauralization has been set to be enabled, at least the binauralization in the first processing is stopped.

3. The control method for a sound signal processor according to claim 1, wherein, when the second output destination is selected and the binauralization has been set to be enabled, different parameters for at least the binauralization in the first processing are used compared to when the first output destination is selected and the binauralization has been set to be enabled.

4. The control method for a sound signal processor according to claim 1, the method further comprising:

performing second processing on a third sound signal having a different number of channels from the first sound signal to generate a fourth sound signal, and outputting the fourth sound signal to the mix bus.

5. The control method for a sound signal processor according to claim 4, wherein the mix bus mixes the second sound signal with the fourth sound signal, and outputs the mixed signal to the selected output destination.

6. The control method for a sound signal processor according to claim 1, wherein the first output destination is headphones or earphones, and wherein the second output destination is loudspeakers.

7. The control method for a sound signal processor according to claim 1, wherein the first output destination and the second output destination are selected exclusively.

8. The control method for a sound signal processor according to claim 1, wherein enabling/disabling the binauralization in the first processing is set according to a user operation.

9. A sound signal processor, comprising:

a mix bus;

a selection unit that selects, from among at least a first output destination and a second output destination, an output destination for a sound signal from the mix bus;

a first processing unit that performs first processing, which includes at least binauralization, on a first sound signal to generate a second sound signal, and outputs the second sound signal to the mix bus;

a setting unit that sets the binauralization in the first processing to be enabled/disabled; and a control unit that, when the second output destination is selected by the selection unit, substantially disables the application to the first sound signal of at least the binauralization in the first processing, even when the binauralization has been set to be enabled by the setting unit.

10. The sound signal processor according to claim 9, wherein, when the second output destination is selected and the binauralization has been set to be enabled, the control unit stops at least the binauralization in the first processing.

11. The sound signal processor according to claim 9, wherein, when the second output destination is selected and the binauralization has been set to be enabled, the control unit uses different parameters for at least the binauralization in the first processing compared to when the first output destination is selected and the binauralization has been set to be enabled.

12. The sound signal processor according to claim 9, further comprising:

a second processing unit that performs second processing on a third sound signal having a different number of channels than the first sound signal to generate a fourth sound signal, and outputs the fourth sound signal to the mix bus.

13. The sound signal processor according to claim 12, wherein the mix bus mixes the second sound signal with the fourth sound signal, and outputs the mixed signal to the selected output destination.

14. The sound signal processor according to claim 9, wherein the first output destination is headphones or earphones, and wherein the second output destination is loudspeakers.

15. The sound signal processor according to claim 9, wherein the first output destination and the second output destination are selected exclusively.

16. The sound signal processor according to claim 9, wherein enabling/disabling the binauralization in the first processing is set according to a user operation.

* * * * *